April 4, 1939.  F. W. MANNING  2,152,900

PROCESS OF COUNTERCURRENT FABRIC FILTRATION

Original Filed Oct. 29, 1934  5 Sheets-Sheet 1

INVENTOR:
Fred W. Manning

April 4, 1939. F. W. MANNING 2,152,900
PROCESS OF COUNTERCURRENT FABRIC FILTRATION
Original Filed Oct. 29, 1934 5 Sheets-Sheet 2

INVENTOR:
Fred W Manning

April 4, 1939.  F. W. MANNING  2,152,900
PROCESS OF COUNTERCURRENT FABRIC FILTRATION
Original Filed Oct. 29, 1934   5 Sheets-Sheet 4

INVENTOR:
Fred W. Manning

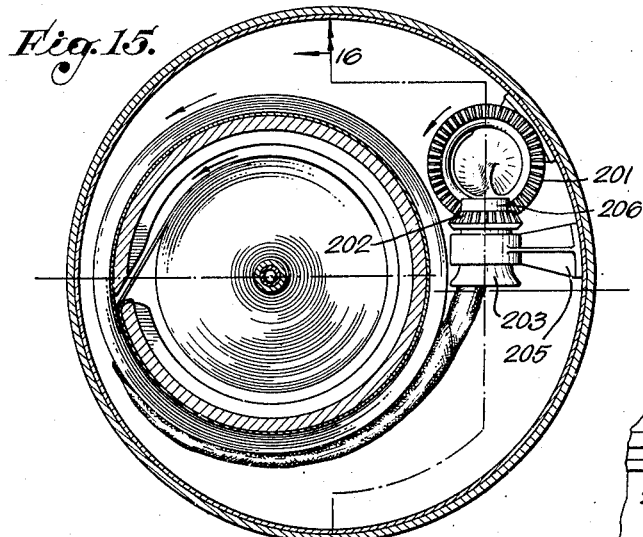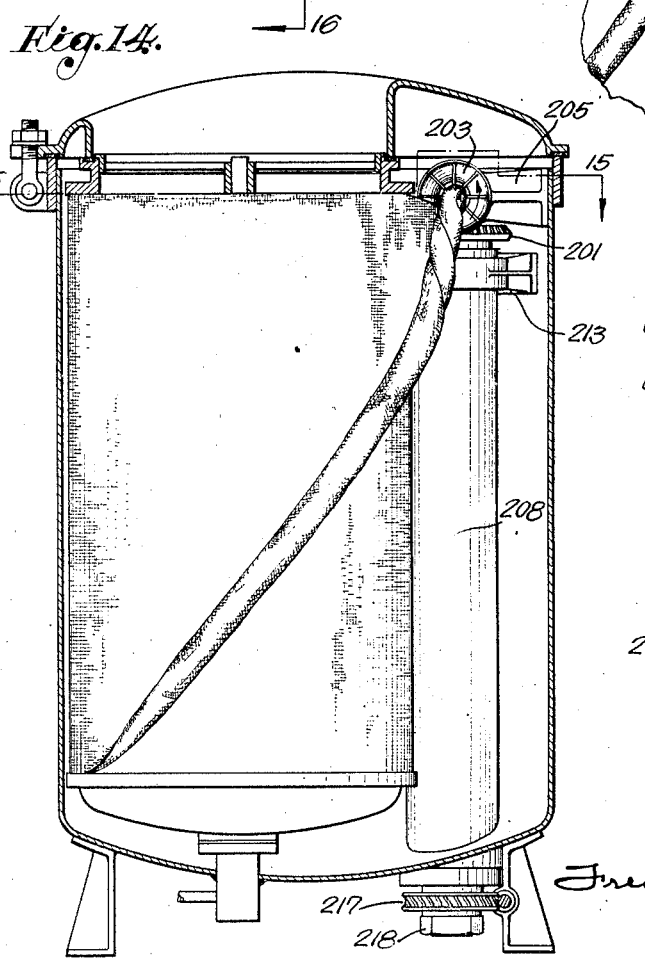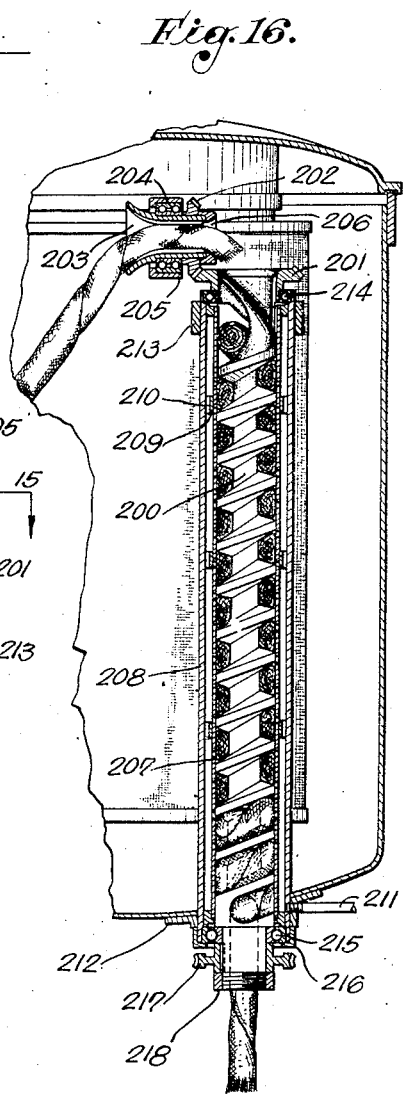

Patented Apr. 4, 1939

2,152,900

UNITED STATES PATENT OFFICE 2,152,900

PROCESS OF COUNTERCURRENT FABRIC FILTRATION

Fred W. Manning, Altadena, Calif., assignor to F. W. Manning Company, Ltd., Los Angeles, Calif., a corporation of California Application October 29, 1934, Serial No. 750,460
Renewed November 19, 1938

20 Claims. (Cl. 210—177)

This invention relates to a filtration process in which contiguous layers of filter fabric are moved continuously in one direction, while the fluid being treated filters therethrough in a counterdirection; and is particularly adapted to the clarification of most fluids where filter aids have been heretofore required for precoating purposes.

It has been the practice heretofore to accomplish the clarification of fluids by means of the passage of the fluid through one thickness of woven or felted fabric, which was first given a thin precoating of some treating agent, such as kieselguhr, to increase the rate of filtrate flow and to prevent the impurities from entering the fabric. Considerable time was lost by such methods resulting from the necessity of returning the first of the filtrate for further filtration; the rate of filtrate flow was generally exceedingly slow due to the compactness of treating solids necessary for the retention of all the impurities on or in the one thin precoating; and the treating value of the agent separated concurrently was but very incompletely utilized before the filtering operation had to be interrupted for the purpose of substituting fresh material for the partly exhausted agent.

It is well known to those versed in the art of filtration that the rate of filtrate flow can be greatly augmented by increasing and maintaining the porosity of the treating agent that makes up the filter bed, and that the required clarity can be obtained with the increased porosity providing the depth of the filter bed is sufficiently increased; the clarity and flow rate of the filtrate and the porosity and depth of the filter bed generally having definite relative values. It is also known that the treatment of solids and liquids can be made much more effective by their contact when in movement in counterdirections.

The objects of this invention are therefore to provide an improved method whereby a high rate of filtrate flow under a suitable differential pressure can be continuously maintained through a porous fabric filter bed of comparatively great depth moving in a counterdirection to the flow of the fluid being filtered, and renewed as required from a reserve roll of fabric out of contact with the fluid; to eliminate the usual filter bed forming period resulting in a contaminated filtrate; to greatly reduce the amount of treating agent, or filter fabric used; and when desirable, to compact and extrude the fabric from the filter chamber as it becomes contaminated.

In accordance with my invention, a treating agent is deposited on a scrim, or other open mesh fabric, in such a way that the coated scrim is stretchable or extensible when in use. The fresh filter fabric may be wound into a roll and dropped into position without removing the cover from the filter chamber. A layer of the fabric can then be passed as required through a retaining wall onto the fluid outlet surface of a filter bed of similar layers as the latter is moved relatively to the wall, this causing all the layers to move simultaneously toward the fluid inlet surface of the bed; and also simultaneously with each such movement, a portion of the contaminated fabric is removed from the fluid inlet surface of the bed and either wound into a roll in the filter chamber, or compacted and extruded from the chamber. Claims covering the countercurrent features of this process are to be found in my Patents Nos. 1,686,093, and 1,686,094 granted to me on October 2, 1928.

The relative movement between the filter bed and its retaining wall, whereby a filter fabric may be passed through the wall to the fluid outlet side of the bed and finally removed from the fluid inlet side of the same bed, is accomplished by reversing the filter differential pressure to a filtrate differential pressure, and holding either the bed or the wall stationary while the other is rotated. This reversal may be accomplished in several ways. A steady filter pressure may be maintained at all times and the reversal obtained by forcing the filtrate back against the filter pressure by means of a hydrostatic head, or moving plunger, cooperating with the filtrate line at suitable intervals; or the filtrate may be discharged against a constant head and the reversal obtained by cutting off the filter pressure completely and allowing a sufficient amount of the unfiltered liquid to escape from the filter into an air chamber, or to the pump suction, to permit the filter pressure to drop; or, in some cases where little stretching of the fabric is required as when the filter bed is quite shallow, the renewal of the fabric may be accomplished by substantially balancing the filter and filtrate pressures, as by shutting off either the filtrate outlet or the supply of the unfiltered liquid. In the operation of the above methods, steam, air, or other gaseous fluid, may also be used directly or indirectly as the means to force back the required amount of filtrate.

The filtrate differential pressure should be just sufficient to lift the portions of the fluid outlet side of the filter bed from their pressed-in positions in the perforations, or grooves, of the retaining wall and to interpose a film of the filtrate fluid between the bed and the imperforated, or plain, portions of the wall, so that the relative movement between the two can be accomplished with as little friction as possible; and the length of time that the pressure is applied will depend upon the amount of fresh fabric fed into filtering position and the corresponding amount of contaminated fabric removed from filtering position, and the rapidity with which the renewal is accomplished. The renewal of the filter bed may continue for a predetermined interval controlled by a timing mechanism, and this interval may be repeated with sufficient frequency to maintain the filter pressure, or the filtrate head, or the filtrate flow rate, substantially constant. However, for most purposes I have found it desirable to make the renewal of the filter bed responsive to the differential pressure between the filter feed and filtrate lines. Shutting off a filtrate line will then cause no wastage through renewing of the filter bed. If it is desirable to use pump suction to create the filter differential where hot fluids, or fluids carrying dissolved or absorbed gases, are to be filtered, then the reversal to a filtrate differential pressure should be accomplished with sufficient frequency to condense or reabsorb any vapors or gases formed during the filter differential period before such vapors or gases begin to appreciably reduce the space occupied by the filtrate.

The treating agent with which the scrim, or open mesh fabric, or warp threads, or assembly of unspun fibers, is coated and impregnated, may consist of cellulose, asbestos, or other suitable fibrous materials of vegetable, animal, or mineral origin; and such compressible solids may be impregnated by, or mixed with, non-compressible treating solids such as fuller's earth, carbons, kieselguhr, salts of metals, etc., for decolorizing, catalyzing, combining with sulphur compounds, and for other purposes. The manufacture of such filter fabrics is described in my Patents Nos. 1,782,784 and 1,782,785 granted November 25, 1930, and No. 1,786,669, granted December 30, 1930.

The extent to which a filter fabric must be stretched in its countercurrent movement from the fluid outlet surface of a filter bed to the fluid inlet surface of the bed, will depend upon the depth of the bed, providing the latter is annular in shape and the direction of movement is to increase the diameters of the annular layers. If the bed is of considerable depth, the natural stretch of a scrim will not be sufficient but may be increased to any required extent by waving the longitudinal threads as the treating agent is about to be deposited thereupon. This can be accomplished by giving the scrim a traversing motion as the latter is fed over the feeding roll onto the foraminous supporting member through which the conveying fluid is passed. Warp threads, if passed through a reed or over a comb to keep them in proper alignment as they move onto the feeding roll, may be used without any filling woven into them. The deposited treating agent in which fibers are placed in random formation, will tend to bond the threads together, and this action can be aided by mixing with the treating agent, or depositing first, fibers of comparatively great length, such as the white shearings that result in the making of napped goods; or, the fabric may be reinforced by wavy warp threads of opposed reciprocations by means of a double set of feeding rolls for two sheets of threads alternating in their transverse movements; or, the second sheet of warp threads may be fed onto the filter drum after it leaves the depositing chamber and before it separates from the fabric, thereby placing the wavy warp threads of opposed reciprocations on opposite sides of the sheet of deposited fibers. Wavy warp threads without woven filling but with well distributed bonding fibers will give longitudinal stretch without width interference in the operation of the filter. Unspun fibers in the form of a sheet of rovings or card slivers in which the fibers are placed in random or wavy formation, may also be substituted for a scrim or other open mesh fabric. If necessary, the rovings may be drawn out and attenuated and fed forward to a fiber cutting means by well known methods before being deposited on the foraminous member through which the conveying fluid passes. This arrangement of substituting rovings or card slivers for an open mesh fabric will also provide for longitudinal stretch without width interference, but the reinforcing fibers must have sufficient length and strength to convey the deposited fibrous filling in the normal operation of the filter. The passage of the conveying fluid will cause the filling to become embedded in the reinforcing assembly of longer fibers or threads; and their passage between compacting or drying rolls will further bond the two together, and at the same time give the fabric a substantially smooth surface. Sizing, or other adhesive, on either the reinforcing threads or filling, may also be used to further bond the two together. The stretching of the filter bed as the fabric layers become contaminated increases the porosity of the bed with a resulting increase in its capacity to take up solid impurities from the fluid being filtered.

The invention is exemplified in the following description, and one form of apparatus for carrying out the process is illustrated by way of example in the accompanying drawings, in which:

Fig. 14 is a vertical section of the tank of a filter having a fabric extrusion device, the filter roll being shown in elevation.

Fig. 15 is a cross-section of the filter tank taken on line 15—15 of Fig. 14.

Fig. 16 is a vertical section of the filter through the extrusion device taken on line 16—16 of Fig. 15.

Figure 1:
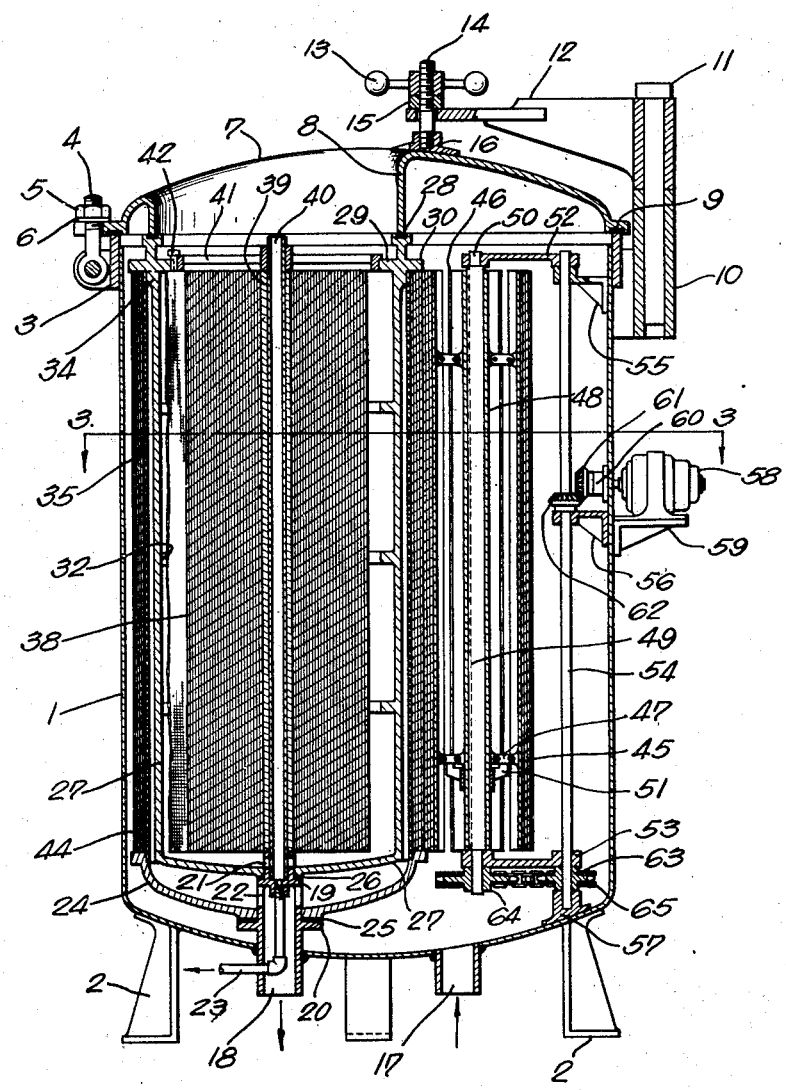
Fig. 1 is a vertical section of the filter taken on line 1—1 of Fig. 3.
Figure 2:
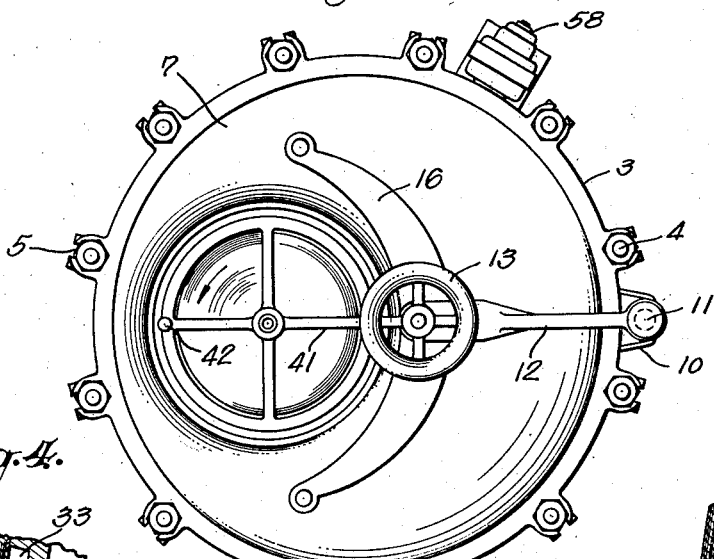
Fig. 2 is a plan view of the filter shown in Fig. 1.
Figure 4:
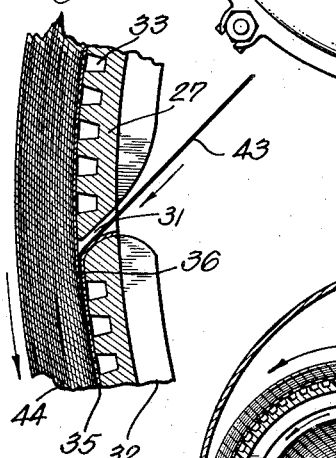
Fig. 4 is a fragmentary cross-section of the filter showing a modified form of the fabric slot arrangement shown in Fig. 3.
Figure 3:
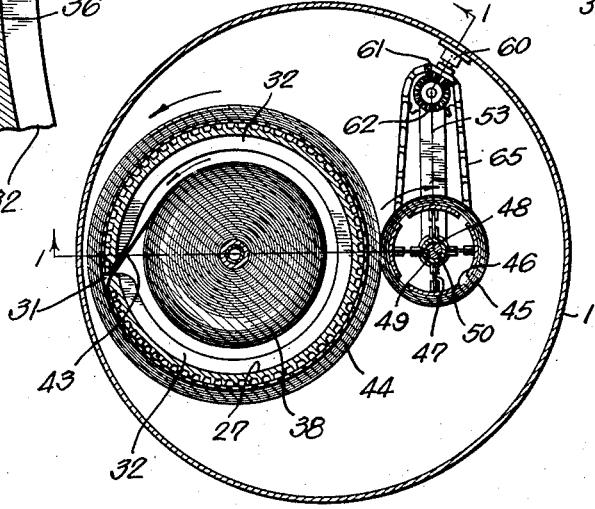
Fig. 3 is a cross-section of the filter taken on line 3—3 of Fig. 1.
Figure 5:
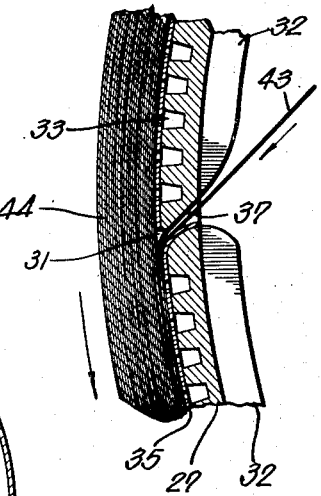
Fig. 5 is a fragmentary cross-section of the filter showing another modified form of the fabric slot arrangement shown in Fig. 3.

Referring more specifically to the drawings by reference characters, the filter tank consists of shell 1, legs 2, bolt ring 3, eye bolts 4, eye bolt nuts 5, washers 6, tank cover 7, cover opening ring 8, cover packing strip 9, cover hinge 10, hinge bolt 11, swivel arm 12, cover lifting wheel 13, cover lifting stud 14, washer 15; and a cover yoke 16. A feed pipe 17 and a filtrate outlet connection 18 are welded to the bottom of the tank, the latter having top and bottom flanges 19 and 20 respectively, top and bottom lateral filtrate openings 21 and 22 respectively, and a central filtrate drip connection 23. An end plate 24 rests on the lower flange of the filtrate outlet connection, and between the two is a gasket 25; and in between the top flange gasket 26 and the cover opening ring is clamped the drainage cylinder 27. The latter is equipped with a top end gasket 28, top inner flange 29, top outer flange 30, a fabric slot 31, circumferential ribs 32, longitudinal drainage grooves 33, a joint shoulder 34, and a foraminous retaining wall 35. To prevent passage of filtered or unfiltered fluid through the fabric slot, an imperforated end of this retaining wall may overlap the slot as shown at 36 in Fig. 4, or a thin independent imperforated plate may be attached to the rear side of the slot and overlap it, as shown at 37 in Fig. 5. A reserve roll of filter fabric 38, which is wound upon a cardboard tube 39, rotates on a pipe axis 40 held rigidly in the upper end of the filtrate outlet connection, the openings in the lower end of the pipe axis being coincident with the upper lateral openings in the filtrate outlet connection. The upper end of the pipe axis is supported by a spider 41, which may be engaged with the drainage cylinder by means of the dowel pin 42. A fabric layer 43 passes through the slot in the drainage member, around which it is wound in annular rings 44; and from which it is removed, as it becomes contaminated, to be again wound into an annular roll 45 on a collapsible arbor. This arbor consists of movable shoes 46 attached by links 47 to the pipe 48 in which is embedded a key 49 that engages a keyway in the driven shaft 50, the downward movement of the links being prevented by the stops 51. The driven shaft is supported at the top and bottom by links 52 and 53 respectively, through whose outer ends pass the driving shaft 54, which in turn is supported at top, center, and bottom by the bearing brackets 55, 56 and 57 respectively. Power for rotating the arbor is received from the motor 58 supported on the outside of the tank by the bracket 59; and to the end of the motor shaft, which passes into the tank through the stuffing box 60, is keyed the bevel gear 61, which drives a similar gear 62 on the driving shaft; and to the lower ends of the driving and driven shafts are rigidly attached the sprocket wheels 63 and 64 respectively, connected together by the sprocket chain 65.

Figure 6:
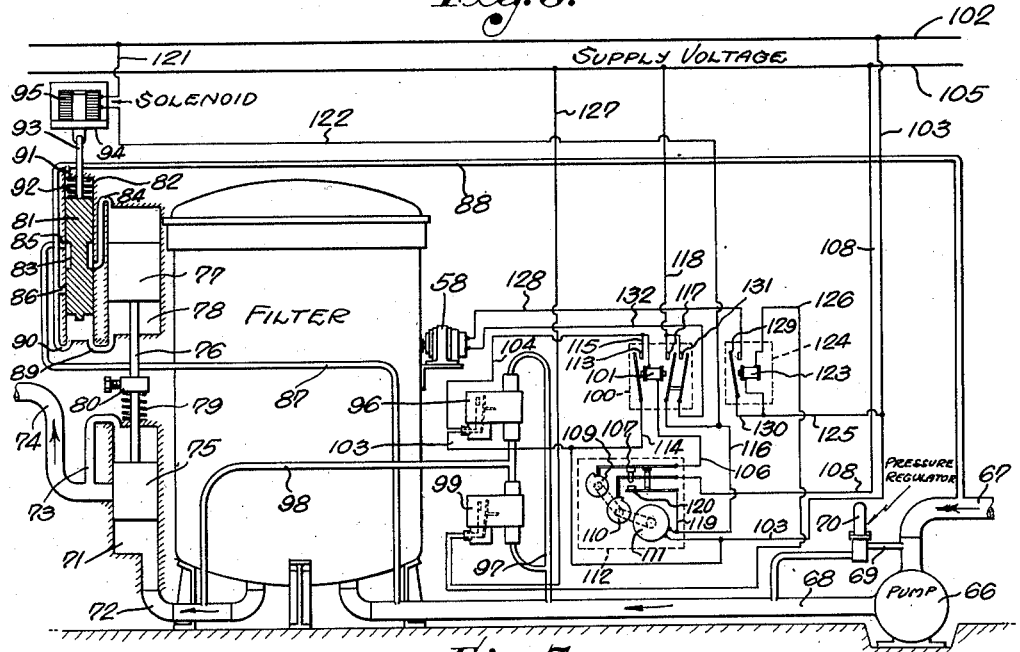
Fig. 6 is a diagrammatic arrangement of the filter control when pump pressure is used to create the filter pressure differential.

Fig. 6 shows the electric control arrangement for automatically and counter-currently renewing the filter bed of fabric layers, for a piping arrangement in which pump pressure on the unfiltered side is used to create the necessary pressure differential. Pump 66 has a suction line 67, and a pressure line 68 connected to the feed inlet of the filter; and on a by-pass connection 69 between the two lines is a pressure regulator 70. A positive displacement pump cylinder 71 is inserted in the filtrate line 72 connected to the filtrate outlet of the filter, having a by-pass connection 73 connecting the upper end of the cylinder to the delivery end 74 of the filtrate pipe. Piston 75 is connected by piston rod 76 to motivating piston 77, operating in the cylinder 78, the magnitude of the force exerted by the latter piston on the former piston being regulated by spring 79 and adjustable collar 80. Adjacent to the motivating cylinder is a piston valve 81 operating in a cylinder 82, the valve having a central annular port 83 connected permanently by a passage 84 to the upper end of the motivating cylinder, and alternately to ports 85 and 86 leading to the pump discharge and pump suction lines 87 and 88 respectively. Drainage connection 89 connects the lower end of the motivating cylinder to the lower end of the piston valve cylinder; and drainage connections 90 and 91 connect the lower and upper ends of the piston valve cylinder respectively to the pump suction line. The piston valve is normally held down by the spring 92, and is connected by the valve rod 93 to the plunger 94 of the solenoid 95. Differential pressure switch 96 is connected to the filter feed by line 97, and to the filtrate pipe by line 98, both of which lines are also connected to the differential pressure switch 99. Double-pole single-throw normally open electrically locking relay 100 is equipped with a coil 101, which is connected to line 102 by lead 103 through the differential pressure switch 96 and lead 104; and to line 105 by lead 106, contact 107 and lead 108, the contact being operated by cams 109 and 110 and synchronous motor 111 of the single-pole double-throw time switch 112. Contact 113 is connected as a shunt across switch 96 by lead 114 and 115. Synchronous motor 111 is connected to line 102 by lead 103; and to line 105 by either lead 116, contact 117, and lead 118; or by lead 119, contact 120 and lead 108. Solenoid 95 is connected to line 102 by lead 121; and to line 105 by leads 122 and 116, contact 117 and lead 118. Coil 123 of the single-pole, single-throw normally open relay 124, is connected to line 102 by leads 125 and 103; and to the line 105 by lead 126, switch 99 and lead 127. Motor 58 is connected to line 102 by lead 128, contact 129, and leads 130, 125, and 103; and to the line 105 by lead 118, contact 131 and lead 132.

Figure 7:
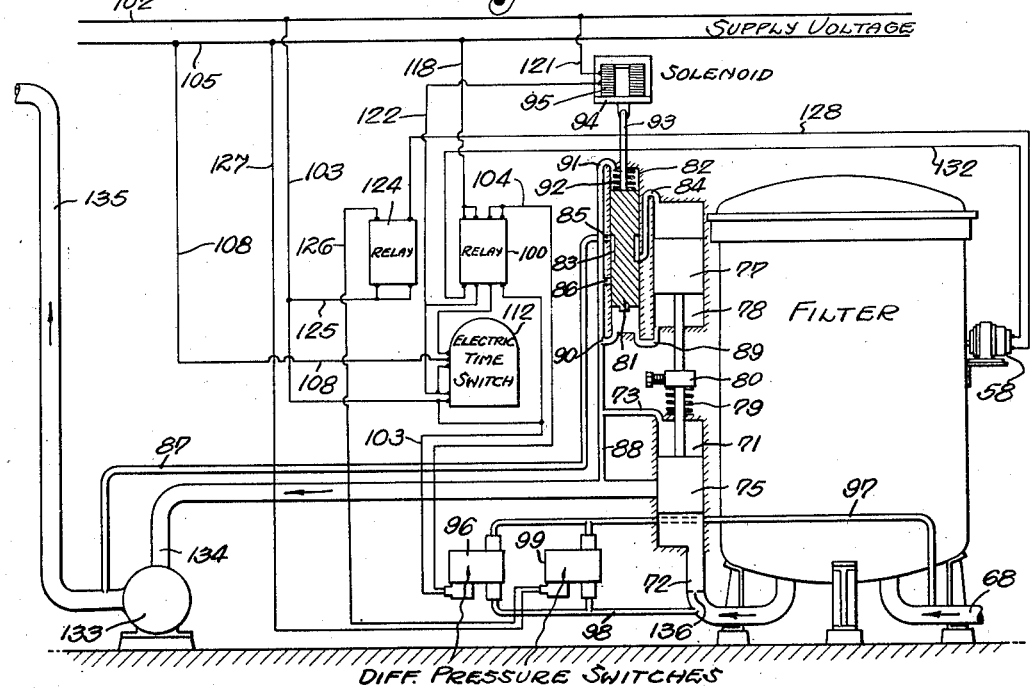
Fig. 7 is a diagrammatic arrangement of the filter control when pump suction is used to create the filter pressure differential.

Fig. 7 shows an electric control for a piping arrangement in which suction from the pump 133 is used to create the necessary pressure differential, the filtrate being taken into the pump from line 134 and discharged from the pump through line 135; and in other respects is similar to Fig. 6 except that an orifice 136 is placed in the filtrate line 72.

Figure 8:
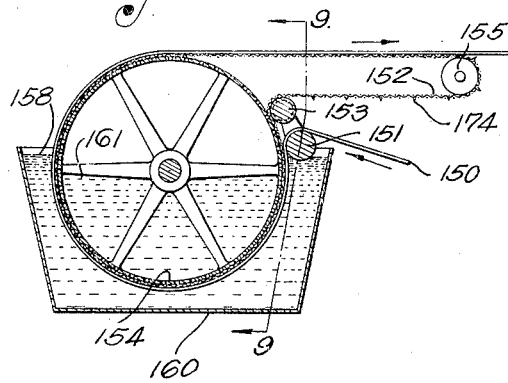
Fig. 8 is a vertical section of a filter fabric wet deposition apparatus.
Figure 9:
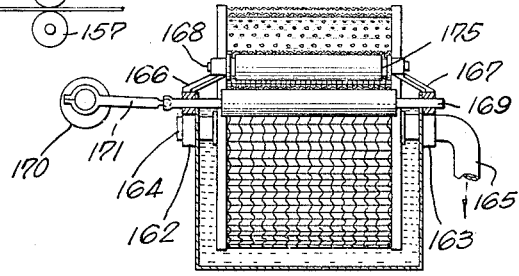
Fig. 9 is a vertical section of a filter fabric wet deposition apparatus taken on line 9—9 of Fig. 8.
Figure 12:
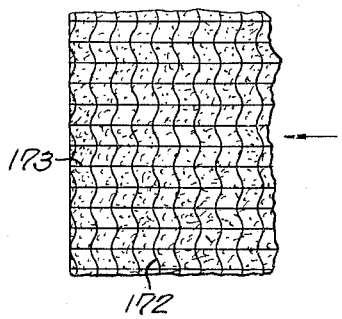
Fig. 12 is an enlarged fragmentary plan view of the reinforcing thread side of the filter fabric.
Figure 13:
Fig. 13 is a cross-section of the filter fabric shown in Fig. 12.

Figs. 8 and 9 show a wet deposition machine in which threads or an open mesh fabric 150 is fed over the roll 151 onto an endless wire belt 152, which passes over a guiding roll 153 around a foraminous drum 154 and returns around the tension roll 155, the fabric separating from the belt to pass between the upper and lower dewatering, or compacting rolls 156 and 157, respectively. The fluid 158, in which the treating agent 159 is mixed, is contained in the tank 160, and is held at a level sufficiently higher than the level of the fluid 161 within the drum to satisfactorily deposit the agent on the open mesh fabric by the passage therethrough of the conveying fluid. Bearings 162 and 163 attached to the sides of the tank support the axis 164 of the drum, the fluid from which the treating agent has been screened leaving the drum by the outlet 165. Bearing brackets 166 and 167 support the axis 168 of the belt guiding roll, as well as the axis 169 of the fabric feeding roll, the latter being given a lateral movement by means of eccentric 170 and the eccentric rod connection 171 to the axis of the roll. This lateral movement of the feeding roll, as an open mesh fabric is fed onto the drum, causes the warp threads 172 to become wavy, the weft threads 173 remaining straight, as shown in Figs. 12 and 13. The passage of the conveying fluid through the fiber will prevent the warp threads from straightening out until a sufficient amount of the treating agent has become embedded in the threads to hold them in place, and passage of the fabric between the compacting rolls will further tend to consolidate the relative position of the threads and treating agent. Pointed projections 174 may also be used to retain the warp threads in a wavy position, by holding the selvaged edges of the fabric in place on the endless wire belt, grooves 175 in the ends of the guiding roll permitting the projections to pass thereover.

Figure 10:
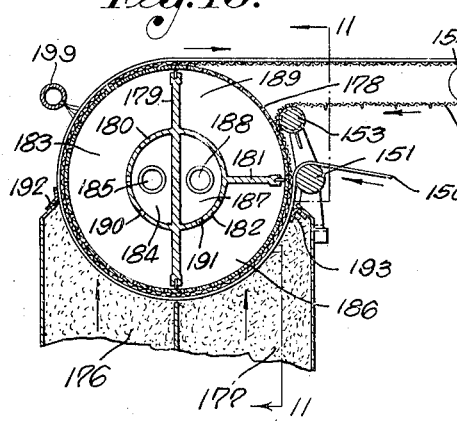
Fig. 10 is a vertical section of a filter fabric dry deposition apparatus.
Figure 11:
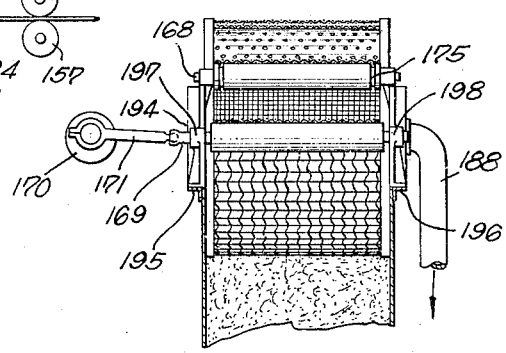
Fig. 11 is a vertical section of a filter fabric dry deposition apparatus taken on line 11—11 of Fig. 10.

Figs. 10 and 11 show a dry process deposition machine in which many of the parts are similar to the parts described in Figs. 8 and 9 and bear same identification numbers. However, in the dry process an elastic conveying fluid, such as air, is substituted for the liquid conveying fluid of the wet process, a plurality of deposition chambers 176 and 177 being used for the conveyance and deposition of a number of different treating agents, such as cellulose and asbestos fibers, in succession or in mixture upon an open mesh fabric as it is carried around the rotating foraminous drum 178. The drum's stationary partitions consist of vertical web 179, semi-circular web 180, horizontal web 181, and a semi-circular web 182, which separate the suction chambers 183 and 184 and suction outlet 185 for one treating agent from the suction chambers 186 and 187 and suction outlet 188 for another treating agent, and also from the chamber 189, which has no outlet, openings 190 and 191 connecting the first and second set of suction chambers, respectively. Soft packing strips 192 and 193 help to prevent ingress of air to, or egress of the conveying fluid from, the deposition chambers. The drum axis 194 is supported by the angle iron bearings 195 and 196, and the ends of the belt guiding and fabric feeding rolls, by bearings 197 and 198, all of the bearings being attached to the sides of the deposition chambers. The movement of the conveying fluid, or filter differential pressure, may be caused by blowers below the deposition chamber or suction fans attached to the fluid outlet pipes. The movement of the treating agents is shown upward but the construction of the apparatus would be much the same if the movement were downward. If the movement is upward, the lighter of two agents in mixture will be deposited first; if downward, the heavier will be deposited first. For this reason it will generally be found advantageous to deposit them in succession rather than to try to do it in mixture. Fibers or other treating agents deposited in sheet formation for filtration purposes should be deposited by a filtration process; and the deposition should not be aided by gravity, although the latter may be advantageously used to prevent the deposition of larger particles in the upper movement of the conveying fluid. Pipe 199 may be used for spraying a bonding fluid, such as sodium silicate, onto the freshly deposited treating agent.

Figs. 14, 15 and 16 show a modification of the filter in which both a roll of fresh fabric may be introduced into the filter, and also the contaminated fabric extruded, without removing the tank cover. In these views the inner end of a compaction screw 200 is rigidly attached to, or integral with, a geared ring 201, which meshes with a smaller annular gear 202 that surrounds and is keyed to a deeply ribbed twisting device 203; the twisted fabric being drawn through these annular connections and finally extruded through the center of the outer end of the screw; and the direction of rotation, and ratio, of the annular gears being such that the coating of the fabric is enclosed as it is twisted, and the twisting sufficient to compact the rolled fabric into a firmly twisted cord before the latter enters the screw. The twisting device, whose ribs allow for considerable variations in the amount of fiber coating and collected solids drawn therethrough, rotates in a ball bearing 204, which is supported by the bracket 205, and both bearing and gear are locked in position on the twisting tube by the nut 206. The compaction screw is enclosed within a foraminous cage 207, and the latter is centralized within the pipe 208 by means of the annular rings 209, the fluid expressed from the cage passing through grooves 210 in the rings and finally draining through the outlet 211. The openings in the foraminous cage should not extend close to the upper end in order to prevent escapage of the fluid prior to compaction of the fabric around the screw; and they also should not extend close to the lower end for the purpose of making certain that a torn end of the twisted fabric would turn with the screw instead of being completely extruded from the filter chamber and thereby providing a possible outlet for the unfiltered fluid. The pipe is welded to a flange 212, which is attached to the filter tank; and is held in position at its upper end by a bracket 213, also attached to the wall of the tank. Ball bearing 214 recessed into the upper end of the pipe takes the weight of the screw; and a similar bearing 215 recessed into the lower end of the pipe and held in position by cap 216 takes the thrust of the screw. A worm gear 217, which may be driven by the motor 58 shown in the filter control arrangement of Fig. 6, is keyed to the lower end of the screw and with the lower ball bearing is positioned between the shoulder of the screw and nut 218.

The operation of the apparatus thus constructed has been in part indicated in connection with the foregoing description. When first starting up a filter, the cylindrical drainage member 27 must be wound with a sufficient depth of fabric layers. This can be accomplished by replacing the collapsible arbor 48 with a roll of fabric wound, fibrous coating outwardly, upon a cardboard tube 39; and then inserting an end of the fabric through the slot 31, and rotating the drainage cylinder by means of a spider 41 until the desired depth of filter bed has been attained. The fabric between the bed and filter roll can then be cut, preferably slightly diagonally, to make the upper edge of the filter roll the longer, the freshly cut outer edge of the filter bed being attached to the arbor; and the roll placed within the drainage cylinder, its upper longer edge being inserted between the rear side of the slot and the fabric end now extending through the slot from the inner end of the filter bed, and to which it may be attached. Bolting down of the tank cover will cause the drainage cylinder to be clamped between the cover ring 8 and the flange 19; and the rotation of the arbor during reversal of the filter differential pressure will cause the removal of the fluid inlet surface of the bed onto the removal roll, and the simultaneous addition to the fluid outlet surface of the bed, of a layer of fabric removed from the filter roll, the entire bed being rotated and the removal roll held in pressural contact therewith by the pull of the latter. The bottom flange 24 may rotate with the filter bed but generally it will be held in rigid engagement with the drainage member with which it is recessed, and will only rotate with the latter when building up a new filter bed. The joints between the ends of the filter bed and stationary end flanges will usually be sufficient to prevent passage of unfiltered fluid, although the top end flange may also be constructed to turn, if desired; and both end flanges may also be made to incline toward each other, if shrinkage in the width of the fabric should occur in the countercurrent movement of the filter bed.

Upon contamination of the surface layer or layers of the filter bed, the differential pressure will cause the switch 96 to close and the coil 101 to be energized, thereby closing contacts 113, 117 and 131. Closing of contact 113 electrically locks the relay 100 across the lines 102 and 105; closing of contact 131 connects motor 58 to line 105; and closing of contact 117 starts the synchronous motor 111 in the time switch 112, and energizes the solenoid 95. The energizing of the solenoid causes the valve 81 to assume the position shown connecting the upper part of the cylinder 78 to the filter feed line 68 through ports 84, 85 and pipe connection 87. This causes the piston 77, rod 76, and piston 75 to move downward, the latter closing the filtrate outlet line 74 and entrapping a predetermined amount of filtrate in the lower end of cylinder 71 and thereby placing a reverse differential of predetermined value on filtrate line 72. The magnitude of this reverse differential is controlled by the difference in areas of the pistons 77 and 75, and by the setting of the spring 79, which works against the downward movement of the piston 77. The placing of the reverse differential on the filter bed closes the differential switch 99, thereby energizing coil 123 and closing contact 129, thus connecting the motor 58 to the line 102 and causing the motor to run for a period of time determined by the setting of the cam 110 in the time switch 112. When contact 107 is opened by the cam 110, relay 100 is deenergized, shutting off the motor 58, and deenergizing the solenoid 95; the latter action allowing valve 81 to return to its down position which in turn permits the piston 77, rod 76, and piston 75 to return upward to their normal positions. Filtrate line 72 is now open and the filtering operation proceeds as before if the differential has been reduced so that switch 96 is not again closed immediately. However, if the switch 96 is closed immediately due to the need of removing more of the contaminated fabric from the filter bed, the cycle just described will repeat itself as soon as the time switch 112 resets itself. When contact 107 is opened, relay 124 is deenergized and contact 129 opened thereby disconnecting motor 58 from line 102. Contact 120 is closed an instant after contact 107 is opened, and the synchronous motor 111 will then continue to run until contact 120 is again opened, an instant after which contact 107 is closed resetting the time switch in the position shown. The cycle is then ready to be repeated whenever differential pressure switch 96 is again closed, and will be repeated immediately if switch 96 is already closed.

In case a positive displacement type of pump is used to force fluid through the filter, a pressure regulator must be connected across the suction and discharge of the pump 66 so that when the filtrate line 74 is closed by piston 75 the pressure will not build up unduly. It is also necessary to limit the maximum pressure during normal filtering operation as the filter becomes clogged. If a centrifugal pump with a flat discharge-head curve is used, this pressure regulator is not necessary.

The action is the same whether the filtrate is forced through the filter by pressure or drawn through by suction, as shown in Fig. 7, the only difference being the insertion of the orifice 136 in the filtrate discharge line 72 in the case where the filtrate is drawn through the filter by suction. As the filter clogs up, the flow of fluid through the orifice decreases, decreasing the pressure drop across the orifice and increasing the vacuum in the filter tank. This increases the differential between the inlet and outlet of the filter, and at a predetermined flow this differential will be great enough to operate the differential switch 96 and start the cycle of removing clogged filter fabric. An orifice can also be used in a pressure system as in the suction system, if the pressure to force the fluid through the filter is strictly constant.

In the foregoing example, I have described a process, and an apparatus by which the process may be carried out, in which the relative movement of a filter bed and its retaining wall during a reversal of the filter differential pressure, makes possible a countercurrent operation in which a filter bed of contiguous layers of filter fabric may be moved in a counter direction to the passage of a fluid through the bed. However, it will be obvious that there are several ways in which this may be accomplished. A contaminated fluid inlet layer may be removed from a filter bed on the outside of a stationary annular retaining wall and a fresh layer added to the fluid outlet surface of the bed, simultaneously with the movement of the bed upon the wall during the filtrate differential pressure period, as described above; or a fresh layer may be added to the fluid outlet surface of a stationary filter bed on the outside of an annular retaining wall simultaneously with the movement of the wall during the filtrate differential pressure period, and a contaminated layer removed from the fluid inlet surface of the filter bed by the joint rotation of bed and retaining wall during the filter differential pressure period.

It will also be evident that the filter bed may be placed on the inside of an annular retaining wall, and the fluid to be filtered passed radially outwardly through the bed. In such a case, a fresh layer of fabric would be passed from an outside roll inwardly through the retaining wall and added to the fluid outlet surface of the bed simultaneously with a relative movement of the bed upon the wall during either a retraction of the wall or during a filtrate differential pressure period; and the contaminated fluid inlet layer could be removed at any time during the filter or filtrate differential pressure period, or even when no differential pressure exists.

I claim as my invention:

1. A filtering process comprising: passing a fluid through a filter member supported by a retaining wall, under a filter differential pressure; reversing the filter differential pressure to a filtrate differential pressure; and moving the filter member and retaining wall relatively to renew a portion of the filter member during the reversal of the filter differential pressure.

2. A filtering process comprising: passing a fluid through a filter member supported by a retaining wall, under a filter differential pressure; reversing the filter differential pressure to a filtrate differential pressure, when the filter member has become clogged a predetermined amount; and moving the filter member and retaining wall relatively to renew a portion of the filter member during the reversal of the filter differential pressure.

3. A filtering process comprising: building up a filter member of successive layers of filter material on a retaining wall; passing a fluid to be treated through the filter member thus formed; reversing the filter differential pressure to a filtrate differential pressure; and simultaneously moving the filter member and retaining wall relatively to interpose a fresh layer of filter material between the said member and said wall.

4. A filtering process comprising: building up a filter member of successive layers of filter material on a retaining wall; passing a fluid to be treated through the filter member thus formed; reversing the filter differential pressure to a filtrate differential pressure, when the filter member has become clogged a predetermined amount; and simultaneously moving the filter member and retaining wall relatively to interpose a fresh layer of filter material between the said member and said wall.

5. A filtering process comprising: building up a filter member of successive layers of filter material on a retaining wall; passing a fluid to be treated through the filter member thus formed; reversing the filter differential pressure to a filtrate differential pressure, when the filter member has become clogged a predetermined amount; removing the fluid inlet surface layer of the filter member during the said reversal of the differential pressure; and simultaneously moving the filter member and retaining wall relatively to interpose a fresh layer of filter material between the said member and said wall.

6. A filtering process comprising: passing a fluid to be treated through a filter member of successive layers of filter material on a retaining wall under a filter differential pressure; reducing the filter differential pressure to permit relative movement of the filter member and retaining wall; and moving the filter member and retaining wall relatively during the said reduction of the differential pressure to interpose a fresh layer of filter material between the said member and said wall.

7. A filtering process comprising: passing a fluid to be treated through a filter member of successive layers of filter material on a retaining wall under a filter differential pressure; reducing the filter differential pressure to permit relative movement of the filter member and retaining wall when the filter member has become clogged a predetermined amount; and moving the filter member and retaining wall relatively during the said reduction of the differential pressure to interpose a fresh layer of filter material between the said member and said wall.

8. A filtering process comprising: passing a fluid to be treated through a filter member of successive layers of filter material on a retaining wall under a filter differential pressure; reducing the filter differential pressure to permit relative movement of the filter member and retaining wall; moving the filter member and retaining wall relatively during the said reduction of the differential pressure to interpose a fresh layer of filter material between the said member and said wall; and removing the fluid inlet surface of the filter member to provide fresh filtering surface to the fluid to be treated.

9. A filtering process comprising: passing a fluid to be treated through a filter member of successive layers of filter material; stretching the filter member whereby the porosity of the said member is increased; passing a further amount of the said fluid through the filter member in its extended condition; and repeating the operation whereby the extension of each layer of the filter member is progressively increased with each repetition of the said operation.

10. A filtering process comprising: passing a fluid to be treated through a filter member of successive layers of filter material; stretching the filter member when the said member has become clogged a predetermined amount whereby the porosity of the said member is increased; passing a further amount of the said fluid through the filter member in its extended condition; and repeating the operation whereby the extension of each layer of the filter member is progressively increased with each repetition of the said operation.

11. A filtering process comprising: building up a filter member of successive layers of filter material on a retaining wall; passing a fluid to be treated through the filter member thus formed; stretching the filter member whereby the porosity of the said member is increased; moving the said member and retaining wall relatively to interpose a fresh layer of filter material between the filter member and retaining wall; and passing a further amount of said fluid through the filter member in its extended condition.

12. A filtering process comprising: building up a filter member of successive layers of filter material on a retaining wall; passing a fluid to be treated through the filter member thus formed; removing the fluid inlet surface layer of the filter member to provide fresh filtering surface to the fluid to be treated; stretching the filter member whereby the porosity of the said member is increased; moving the said member and retaining wall relatively to interpose a fresh layer of filter material between the filter member and retaining wall; and passing a further amount of said fluid through the filter member in its extended condition.

13. A filtering process comprising: building up a filter member of successive layers of filter material on a retaining wall; passing a fluid to be treated through the filter member thus formed; removing the fluid inlet surface layer of the filter member to provide fresh filtering surface to the fluid to be treated, when the filter member has become clogged a predetermined amount; simultaneously stretching the filter member whereby the porosity of the said member is increased, and moving the said member and retaining wall relatively to interpose a fresh layer of filter material between the filter member and retaining wall; and passing a further amount of said fluid through the filter member in its extended condition.

14. A filtering process comprising: building up a filter member of successive layers of filter material on a retaining wall; passing a fluid to be treated through the filter member thus formed; stretching the filter member and moving the said member and retaining wall relatively to interpose a fresh layer of filter material between the filter member and retaining wall; passing a further amount of the said fluid through the filter member in its extended condition; and repeating the operation whereby the extension of each layer of the filter member is progressively increased with each repetition of the said operation.

15. A filtering process comprising: building up a filter member of successive layers of filter material on a retaining wall; passing a fluid to be treated through the filter member thus formed; removing the fluid inlet surface layer of the filter member to provide fresh filtering surface to the fluid to be treated, when the filter member has become clogged a predetermined amount; stretching the filter member whereby the porosity of the said member is increased; moving the said member and retaining wall relatively to interpose a fresh layer of filter material between the filter member and retaining wall; and passing a further amount of said fluid through the filter member in its extended condition.

16. A filtering process comprising: passing a fluid through a filter member having a plurality of layers of treating material supported by a retaining wall; moving the filter member and retaining wall relatively to each other along their contacting portions; and interposing a fresh layer of treating material between the said member and said wall during the said relative movement.

17. A filtering process comprising: passing a fluid through a filter member having a plurality of layers of treating material supported by a retaining wall, under a filter differential pressure; reducing the filter differential pressure to permit relative movement of the filter member and retaining wall; moving the filter member and retaining wall relatively to each other along their contacting portions during the change in pressure; removing the fluid inlet surface layer of the filter member; and adding a fresh layer of treating material to the fluid outlet surface of the filter member.

18. A filtering process comprising: passing a fluid through a filter member having a plurality of layers of treating material supported by a retaining wall, under a filter differential pressure; reducing the filter differential pressure to permit relative movement of the filter member and retaining wall; moving the filter member and retaining wall relatively to each other along their contacting portions during the change in pressure; and removing the fluid inlet surface layer of the filter member and simultaneously adding a fresh layer of treating material to the fluid outlet surface of the filter member.

19. A filtering process comprising: passing a fluid through a filter member having a plurality of layers of filter fabric supported by a retaining wall, under a filter differential pressure; reducing the filter differential pressure to permit relative movement of the filter member and retaining wall; moving the filter member and retaining wall relatively to each other along their contacting portions during the change in pressure; removing the fluid inlet surface layer of the filter member; and adding a fresh layer of filter fabric to the fluid outlet surface of the filter member.

20. A filtering process comprising: passing a fluid through a filter member having a plurality of layers of filter fabric supported by a retaining wall, under a filter differential pressure; reducing the filter differential pressure to permit relative movement of the filter member and retaining wall; moving the filter member and retaining wall relatively to each other along their contacting portions during the change in pressure; and removing the fluid inlet surface layer of the filter member and simultaneously adding a fresh layer of filter fabric to the fluid outlet surface of the filter member.

FRED W. MANNING.